(12) United States Patent
Narasimhan et al.

(10) Patent No.: US 9,768,984 B2
(45) Date of Patent: Sep. 19, 2017

(54) ELECTRONIC DEVICE WITH EQUALIZATION, INTEGRATED CIRCUIT AND METHODS THEREFOR

(71) Applicant: MediaTek, Inc., Hsin-Chu (TW)

(72) Inventors: Balachander Narasimhan, Milpitas, CA (US); Charles Chien, California, CA (US); Qiang Zhou, California, CA (US); Chih-Yuan Lin, Yilan County (TW); Cheng-Chou Zhan, Hsinchu (TW); Bao-Chi Peng, Taipei (TW)

(73) Assignee: MediaTek, Inc., Hsin-Chu (TW)

( * ) Notice: Subject to any disclaimer, the term of this patent is extended or adjusted under 35 U.S.C. 154(b) by 0 days.

(21) Appl. No.: 14/990,001

(22) Filed: Jan. 7, 2016

(65) Prior Publication Data

US 2016/0261436 A1 Sep. 8, 2016

Related U.S. Application Data

(60) Provisional application No. 62/129,104, filed on Mar. 6, 2015.

(51) Int. Cl.
*H04L 25/03* (2006.01)
*H04W 4/00* (2009.01)
(Continued)

(52) U.S. Cl.
CPC ........ *H04L 25/03019* (2013.01); *G06K 19/07* (2013.01); *H04B 1/00* (2013.01);
(Continued)

(58) Field of Classification Search
CPC ... H04L 25/03019; H04L 1/203; G06K 19/07; H04B 1/00; H04B 5/0031; H04B 5/0075; H04B 5/0037; H04W 4/008
See application file for complete search history.

(56) References Cited

U.S. PATENT DOCUMENTS 6,370,191 B1 * 4/2002 Mahant-Shetti ........ G06F 7/552
375/233
2007/0096873 A1 * 5/2007 Sadr ..................... G06K 7/0008
340/5.61
(Continued)

OTHER PUBLICATIONS

Blind Equalization Using the Constant Modulus Criterion: A Review C. Richard Johnson, Jr., Philip Schniter, Thomas J. Endres, James D. Behm, Donald R. Brown, and Raul A. Casas.

*Primary Examiner* — Kenneth Lam
(74) *Attorney, Agent, or Firm* — Optimus Patents US, LLC

(57) ABSTRACT

An electronic device for a wireless communication system is described. The electronic device comprises: a receiver configured to receive a modulated signal on a communication channel; and a processor, coupled to the receiver and configured to: process the received modulated signal; identify a communication channel characteristic based on the processed received modulated signal; select an equalizer having a first set of equalization coefficients based on the identified communication channel characteristic, wherein the first set of equalization coefficients is selected from a plurality of equalization coefficients, each of the plurality of equalization coefficients being associated with different communication channel characteristics; equalize the processed received modulated signal on the communication channel using the selected equalizer; and detect the equalized received modulated signal.

15 Claims, 4 Drawing Sheets

(51) Int. Cl.
*H04B 5/00* (2006.01)
*H04L 1/20* (2006.01)
*G06K 19/07* (2006.01)
*H04B 1/00* (2006.01)

(52) U.S. Cl.
CPC ........... H04B 5/0031 (2013.01); H04L 1/203 (2013.01); H04W 4/008 (2013.01); *H04B 5/0037* (2013.01); *H04B 5/0075* (2013.01)

(56) References Cited

U.S. PATENT DOCUMENTS

| | | | |
|---|---|---|---|
| 2009/0219983 A1* | 9/2009 | Gerfers | H04L 25/0305 375/232 |
| 2010/0079261 A1* | 4/2010 | Goto | H04B 5/0075 340/10.51 |
| 2011/0103459 A1* | 5/2011 | Esmailian | H04L 25/03146 375/233 |
| 2013/0064271 A1* | 3/2013 | van de Beek | H04L 27/368 375/219 |
| 2014/0269886 A1* | 9/2014 | Plumb | H04L 25/061 375/232 |
| 2014/0314170 A1* | 10/2014 | Plumb | H04W 52/0261 375/282 |
| 2015/0078429 A1* | 3/2015 | Chen | H04L 25/03159 375/232 |
| 2015/0270921 A1* | 9/2015 | Jia | H04B 10/6165 398/25 |

* cited by examiner

FIG. 1 - Prior Art

ELECTRONIC DEVICE WITH EQUALIZATION, INTEGRATED CIRCUIT AND METHODS THEREFOR

FIELD OF THE INVENTION

The field of this invention relates to electronic devices such as communication units, integrated circuits, and methods for equalization and clustering.

BACKGROUND OF THE INVENTION

Near field communications (NFC) is a set of protocols that enable, for example, smartphones and other devices to establish radio communications with each other by either touching the devices together, or bringing them into close proximity, say to a distance of typically 10 cm or less. NFC always involves an initiator device and a target device; the initiator device actively generates a radio frequency (RF) field that can power a passive target device. This enables NFC target devices to take very simple form factors, such as tags, stickers, key fobs, or cards that do not require relatively large power supplies. NFC peer-to-peer communication is possible, provided both devices are powered.

Thus, in order to support near field communications, NFC devices fall into two main areas: NFC tags and NFC readers/writers. NFC tags often securely store personal contacts, such as debit and credit card information, loyalty program data, PINs, and networking contacts, among other information. NFC tags contain data and are typically read-only, but in some instances may be re-writable. NFC tags can be custom-encoded by their manufacturers, or they can be configured in accordance with specifications provided by a relevant industry association.

NFC readers/writers are typically NFC-enabled devices configured to read information stored on inexpensive NFC tags embedded in, say, labels or smart posters. Both NFC tags and NFC readers/writers are known to have interchangeable functionality and similar (or the same) components and circuits. As such, an NFC device may often function as either a NFC tag or a NFC reader/writer.

One known problem in the provision of NFC-capable devices is the ability of such devices being able to equalize high-data rate signals (e.g. data rates of greater than 848 kbps), as lower data rates do not require equalization. For example, today's RF-ID systems use a 1-bit-per-symbol amplitude-shift-keying (ASK) modulation with maximum potential data rate limited to 6.78 Mbps. However, some companies are proposing schemes to overcome these limitations and reach data rates up to 20.34 Mbps and more. Furthermore, due to the high coupling requirements of a NFC system, and the effects on the coupling due to varying channel characteristics, high-quality ('Q') matching networks are required. If high-quality ('Q') matching networks are used, inter-symbol interference (ISI) of the transferred data may degrade the bit error rate (BER) performance of the NFC link down to more than 0.01%.

Additionally, it is problematic to equalize the high-data rate signals under normal operating constraints, such as: low computational complexity, minimum convergence time and ensuring a high guarantee of convergence. A typical NFC link will also have to cope with different communication channel types, with no loopback schemes or training sequences being available to be used.

FIG. 1 illustrates a known block diagram of a NFC link showing both an uplink communication path 100 and a downlink communication path 150 and the types of signals encountered. In the first uplink communication path 100 load (amplitude) modulation 122, 124 is employed by the NFC devices. A NFC reader 104 instigates a sinusoidal waveform 110 into a radiated field 106, which is looped back to the NFC reader 104 circuitry. A tag 102 varies the impedance in the radiated field 106 by switching ON/OFF a resistor/capacitor (load) 108. In this manner, binary data is encoded onto the sinusoidal waveform 110 as impedance variation and results in modulation of the sinusoidal waveform 120 being returned to the NFC reader 104. In such NFC systems the modulation index can be <1%.

In the second downlink communication path 150, waveform modulation is employed. A NFC reader 154 instigates a sinusoidal waveform 172 into a radiated field 156 to be received by a tag 152. The data is directly mixed with carrier, or multiplied with a sub-carrier before mixing with the carrier. In this manner, encoded binary data may be recovered. In such NFC architectures a minimum modulation index can be of the order of 8%.

Furthermore, in a number of applications, where the communication channel does not exhibit flat fading, the load modulation NFC devices may create inter-symbol interference (ISI) when used with high symbol rates. The NFC channel characteristics are shown in the graph 180, which illustrates two poles in the NFC frequency response. A first pole 182 is determined by NFC reader 104 circuitry (typically with a 1-2 MHz variation as shown), with a second pole 184 determined by the NFC tag 102 (with a 3-7 MHz variation (not shown)).

With such load modulation and waveform modulation techniques, a timing reference and accurate processing of the modulated signals is required in order to correctly recover and demodulate the data. In typical communication techniques, a timing reference can be provided by using a reliable training sequence at the transmitter for the receiver to lock on to.

Alternatively, or for high data rate applications, an equalization technique may be used. As no loopback path may exist in an NFC system, because such systems need to be inherently of low complexity, such an equalization path needs to use blind estimation. Blind estimation techniques do not require a training sequence, as known to those skilled in the art. However, blind estimation techniques introduce problems, such as an increased convergence time due to requiring thousands of bits to achieve convergence, which increases the system's buffering requirements and latency.

US 2013/0064271 A1, by R. C. H. Van de Beek, M. Ciacci, and titled "Adaptive equalizer and/or antenna tuning", describes a loopback training approach whereby a loopback signal is used as training for adaptive pre-equalization. Notably, in order to provide a reliable estimation of the channel in the loopback path, which is used as training for an adaptive pre-equalizer, each channel has its own equalizer. However, in this loopback training approach, the loopback channel is different from the signal channel, thereby introducing errors and inaccuracies. Additionally, loopback training approach requires more than one mixer, thereby adding to the cost and complexity.

Thus, there is a general need for improved concepts to equalize data, and particularly for equalizing data in very high bit rate (VHBR) near field communications (NFC).

SUMMARY OF THE INVENTION

Accordingly, the invention seeks to mitigate, alleviate or eliminate one or more of the above mentioned disadvantages, either singly or in any combination. Aspects of the invention provide a wireless communication unit, an integrated circuit and a method therefore, as described in the appended claims.

According to a first aspect of the invention, there is described an electronic device for a wireless communication system. The electronic device comprising: a receiver configured to receive a modulated signal on a communication channel; and a processor, coupled to the receiver and configured to: process the received modulated signal; identify a communication channel characteristic based on the processed received modulated signal; select an equalizer having a first set of equalization coefficients based on the identified communication channel characteristic, wherein the first set of equalization coefficients is selected from a plurality of equalization coefficients, each of the plurality of equalization coefficients being associated with different communication channel characteristics; equalize the processed received modulated signal on the communication channel using the selected equalizer; and detect the equalized received modulated signal.

In this manner, a similar channel characteristic nature across multiple communication channels may be exploited by using an equalizer that is suited for equalizing that channel or applying one or more equalizer coefficients to a generic equalizer for equalizing that channel.

According to an optional example, the processor may be configured to equalize a received near field communication, NFC, modulated signal by estimating equalization coefficients using a blind equalization algorithm based on the identified communication channel characteristic.

According to an optional example, each equalizer from the plurality of generic equalizers may be configured to equalize a channel set exhibiting a particular communication channel characteristic.

According to an optional example, a plurality of similar communication channels exhibiting a particular communication channel characteristic may have been previously clustered into a channel set.

According to an optional example, the processor may be configured to determine a channel shape from the modulated signal received on at least the communication channel and select an equalizer associated with a cluster of communication channels exhibiting a similar channel shape to the determined channel shape. According to an optional example, the determined channel shape may be based on at least one from a group of: an estimate of an average shape of a received distribution of signals on the communication channel, an estimate of a mid-point shape of a received distribution of signals on the communication channel.

According to an optional example, the processor may be configured to select an equalizer based on the identified communication channel characteristic using an optimality criterion that minimizes inter-symbol interference for channel responses for each of the channel set clusters.

According to an optional example, the processor may be configured to determine whether the identified communication channel characteristic is within a threshold of being similar to a pre-determined communication channel characteristic and selects an equalizer based thereon. The processor may also be configured to calculate a bit error rate (BER) or frame error rate (FER) of the received signal such that the processor selects the equalizer based on the BER or FER of the received signal.

According to an optional example the processor may be further configured to perform a cyclic redundancy check (CRC) on each generic equalizer output and select an equalizer output to detect based on the CRC.

According to an optional example, the processor may be further configured to compute a constant modulus error at the generic equalizer output and select an equalizer output to detect based on the constant modulus error.

According to an optional example, the plurality of equalizers may be configured to apply at least one respective equalizer coefficient based on at least one pre-calibrated communication channel characteristic.

According to a second aspect of the invention, an integrated circuit for a wireless communication system is described. The integrated circuit comprises a processor configured to: receive a modulated signal on a communication channel; process the received modulated signal; identify a communication channel characteristic based on the processed received modulated signal; select an equalizer having a first set of equalization coefficients based on the identified communication channel characteristic, wherein the first set of equalization coefficients is selected from a plurality of equalization coefficients, each of the plurality of equalization coefficients being associated with different communication channel characteristics; equalize the processed received modulated signal on the communication channel using the selected equalizer; and detect the equalized received modulated signal.

According to a third aspect of the invention, a method for equalizing a signal in a wireless communication system is described. The method comprises: receiving a modulated signal on a communication channel; processing the received modulated signal; identifying a communication channel characteristic based on the processed received modulated signal; selecting an equalizer having a first set of equalization coefficients based on the identified communication channel characteristic, wherein the first set of equalization coefficients is selected from a plurality of equalization coefficients, each of the plurality of equalization coefficients being associated with different communication channel characteristics; equalizing the processed received modulated signal on the communication channel using the selected equalizer; and detecting the equalized received modulated signal.

According to a fourth aspect of the invention, a near field communication, NFC, system comprising a NFC tag in communication with a NFC electronic device is described, The NFC electronic device comprises: a receiver configured to receive a modulated signal on a NFC communication channel; and a processor, coupled to the receiver and configured to: process the received modulated signal; identify a NFC communication channel characteristic based on the processed received modulated signal; select an equalizer having a first set of equalization coefficients based on the identified communication channel characteristic, wherein the first set of equalization coefficients is selected from a plurality of equalization coefficients, each of the plurality of equalization coefficients being associated with different communication channel characteristics; equalize the processed received modulated signal on the NFC communication channel using the selected equalizer; and detect the equalized received modulated signal.

According to a fifth aspect of the invention, a processor for a computer for clustering communication channel characteristics to equalize a signal is described. The processor is configured to: process signals received on a plurality of communication channels; identify a range of values of at least one communication channel characteristic from signals received on the plurality of communication channels; cluster those channels exhibiting the identified range of values into a plurality of channel sets; select at least one equalizer coefficient for each of the channel set clusters; and apply a plurality of different equalizer coefficients to a respective plurality of equalizers based on the range of values of the at least one communication channel characteristic.

In this manner, a generic equalizer having one or more equalization coefficients may be allocated to equalize signals from each of a cluster of similar communication channels, for example to use when detecting very high bit rate (VHBR) communication in near field communications (NFC). Furthermore, in this manner, a cluster may be formed such that one equalizer provides acceptable performance for every channel in the cluster. Thereafter, for example, a classification system may determine whether signals received on a current channel may belong to any one of the known channel clusters, and equalize the signals accordingly by applying at least one respective equalizer coefficient(s) associated with the known channel cluster.

According to an optional example, the at least one communication channel characteristic may comprise a varying channel shape and wherein the processor may be configured to cluster communication channels exhibiting similar channel shapes into a particular channel set.

According to an optional example, the processor may be configured to compute a bit error rate (BER) or frame error rate (FER) of the signals received on the plurality of communication channels and configured to cluster communication channels exhibiting similar BER or FER into a particular channel set.

According to an optional example, the processor may be configured to cluster communication channel characteristics to equalize a signal in one from a group of: in a laboratory, on-chip in an electronic device's integrated circuit that comprises the processor.

According to a sixth aspect of the invention, a method for clustering communication channel characteristics to equalize a signal in a wireless communication system is described. The method comprises: processing signals received on a plurality of communication channels; identifying a range of values of at least one communication channel characteristic from signals received on the plurality of communication channels; clustering those channels exhibiting the identified range of values into a plurality of channel sets; selecting at least one equalizer coefficient for each of the channel set clusters; and applying a plurality of different equalizer coefficients to a respective plurality of equalizers based on the range of values of the at least one communication channel characteristic.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the FIGs are illustrated for simplicity and clarity and have not necessarily been drawn to scale.

DETAILED DESCRIPTION

Although examples of the invention are described with reference to a near field communication link, with corresponding communication units, integrated circuits and methods of equalization, it is envisaged that the concepts described herein may be embodied in any scenario or communication system where multiple communication channels exhibiting similar channel characteristics may be found (referred hereafter as 'channel sets'), such that the similar channel characteristic nature may be exploited. As such, the described embodiment of a near field communication link is only one such envisaged application for the concepts described herein.

Some examples of the invention provide an NFC device, and an integrated circuit for an NFC device, that provide equalization coefficients, for example for high data rate ISI scenarios. In some example embodiments, the proposed equalization technique requires no training sequence and provides a fast estimation time. In some examples, a similarity between sets of channel shapes is used to consolidate equalizers in a blind equalization technique.

In some examples, a pre-calibrated equalization scheme based channel information for NFC is described. Here, the pre-calibrated equalization scheme employs coefficients that are estimated based on an available channel set. If the given channel set has highly varying channel shapes, one example embodiment of the invention proposes to group these into subsets of similar shapes, and thereafter estimate equalizer coefficients to be applied to a generic equalizer for each channel set.

In contrast to known techniques, examples of the invention do not require any training during normal operation. Furthermore, in contrast to known techniques, examples of the invention do not suffer from latency to the same degree, as no real-time computation is necessary.

Furthermore, because the illustrated examples of the present invention may for the most part, be implemented using electronic components and circuits known to those skilled in the art, details will not be explained in any greater extent than that considered necessary as illustrated below, for the understanding and appreciation of the underlying concepts of the present invention and in order not to confuse or distract from the teachings of the present invention.

Figure 1:
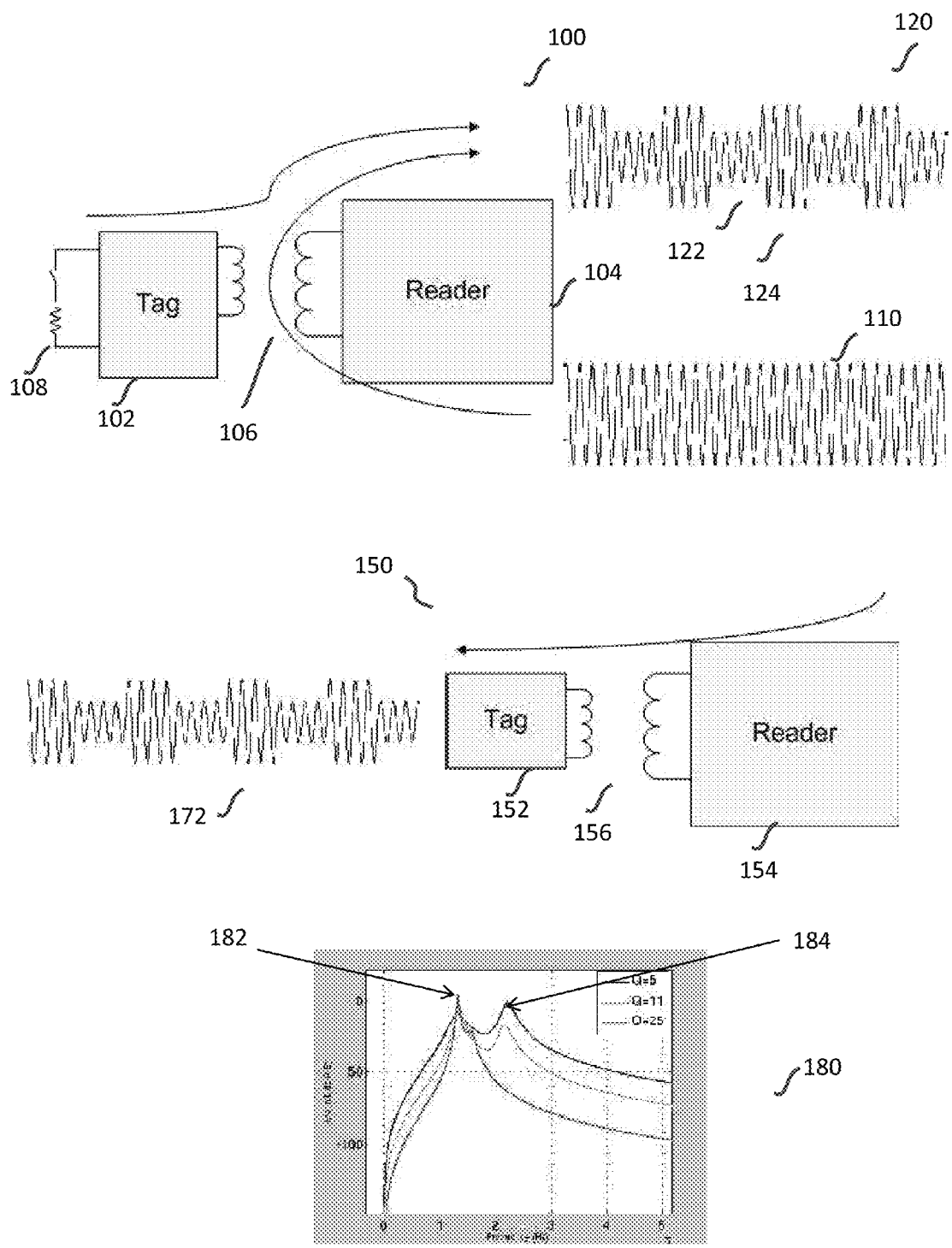
FIG. 1 illustrates a known block diagram of a NFC uplink and downlink communication link.
Figure 2:
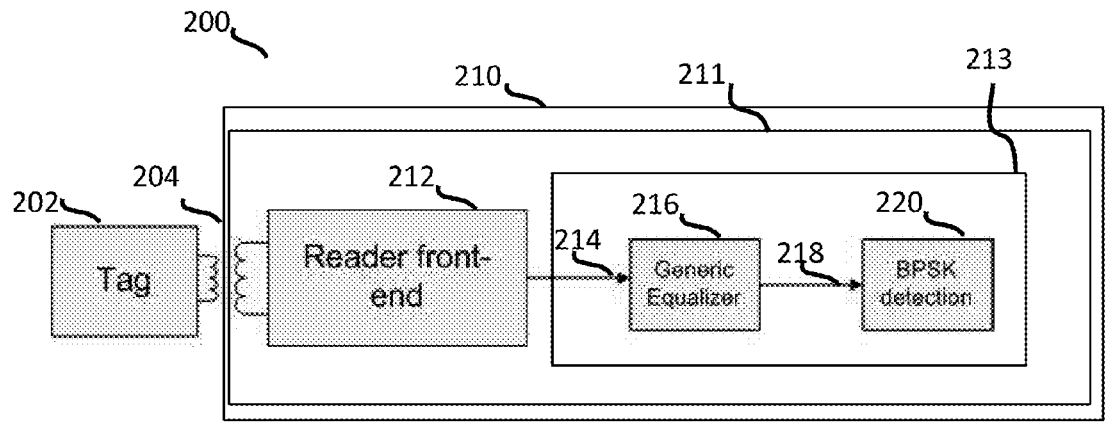
FIG. 2 illustrates an NFC communication device comprising a generic equalizer according to a first example embodiment of the present invention.

Referring to FIG. 2, there is illustrated an example of a simplified block diagram of part of an electronic device adapted to support the inventive concepts of an example of the present invention. FIG. 2 illustrates a NFC communication system 200 comprising a NFC communication link. Electronic devices, in the context of the illustrated example of the invention, include an NFC reader circuit 210 and a tag 202. Again, in an uplink communication path, load modulation is employed, whereby NFC reader circuitry 210 instigates a sinusoidal waveform into a radiated field 204, which is looped back to the NFC reader circuit 210. The tag 202 varies the impedance in the radiated field 204, for example by switching 'ON'/'OFF' a resistor/capacitor load (not shown). In this manner, binary data is encoded as impedance variation, and results in modulation of the sinusoidal waveform being returned to the NFC reader circuitry 210 from the tag 202. In this example, the NFC reader circuitry 210 comprises an integrated circuit 211 that in some examples comprises a reader front end 212 that is arranged to capture the returned modulated sinusoidal waveform and a processor 213, such as a digital signal processor. The reader front end 212 comprises at least a down-conversion mixer and an analog-to-digital converter to output a digital signal to be equalized.

The reader front end 212 provides a digital signal 214 to processor 213 (that comprises in hardware, firmware or software) a generic equalizer 216, which is configured to produce an equalized bit stream output 218 that is input to a detector. In the context of the present invention, a generic equalizer may comprises a processor that is capable of performing an equalizer function on a received signal where the equalizer coefficients, as applied to equalizer taps, are dynamically programmable. In this example, the detector is a binary phase shift keyed (BPSK) detector 220.

In some examples of the invention, the generic equalizer 216 may use prior channel knowledge in order to estimate suitable equalizer coefficients for the taps that sufficiently mitigate inter-symbol interference (ISI) for a given set of 'similar' channels. In particular, examples of the invention provide equalization for high data rate ISI scenarios whereby, given a known set of channel responses (for example closely-shaped or otherwise similar in some sense), a 'generic' equalizer is configured such that equalizer taps are selected in order to mitigate ISI for the set of channel responses.

In some examples of the invention, any from a number of generic equalizer estimation methods may be employed. In a first example, it is envisaged that generic equalizer 216 may be a form of a Finite Impulse Response (FIR) filter, with equalizer tap settings that are set for operating irrespective of channel characteristics. In one example, the equalizer tap setting (sometimes referred to as coefficients) may be estimated during an offline factory calibration process. In some examples, the estimated equalizer tap settings (coefficients) may be permanently stored on the chip.

In some examples of the invention, the generic equalizer 216 may be configured to estimate an 'average' or 'mid-point' shape of the received distribution of signals. The corresponding equalizer taps may then be set based on such an estimate. In a second example, generic equalizer 216 may be configured to use an optimality criterion that minimizes ISI for the given set of channel responses.

Figure 3:
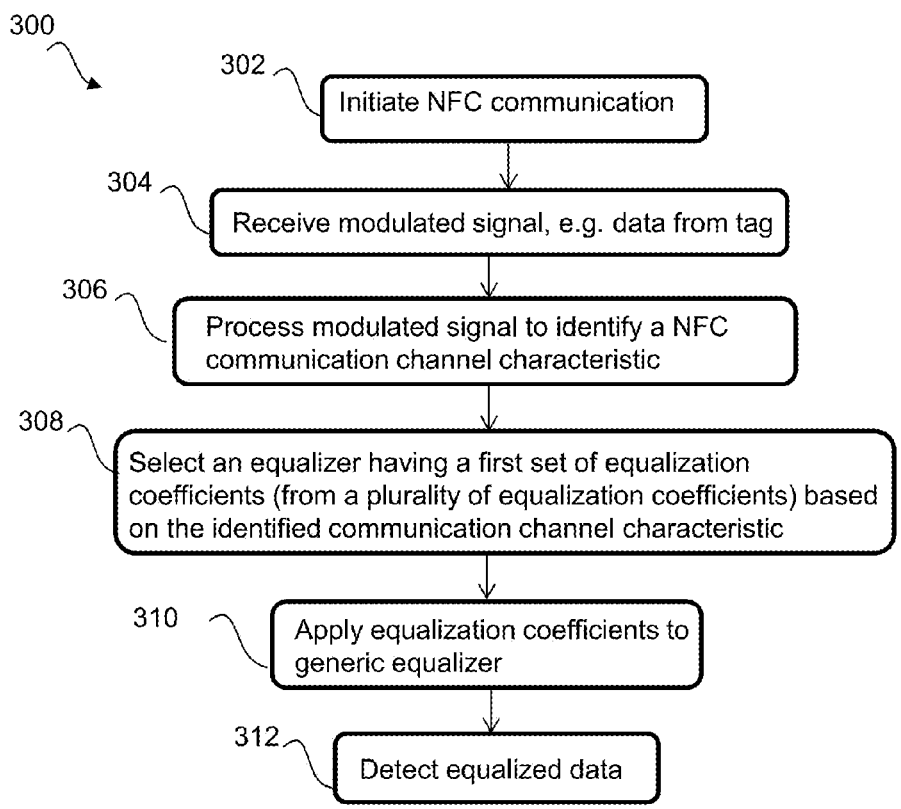
FIG. 3 illustrates a first example flowchart for equalizing very high bit rate (VHBR) near field communications (NFC), according to a first example embodiment of the present invention.

Referring now to FIG. 3, a flowchart 300 illustrates one example processing operation for equalizing very high bit rate (VHBR) communication in near field communications (NFC), according to examples of the present invention, say for generic equalizer estimation 216 of FIG. 2. FIG. 3 illustrates an example flowchart to generate a plurality of equalizers based on the determined channel characteristic.

FIG. 3 commences with a NFC communication being initiated in 302. In this example, data is received from a tag in 304, and the data processed in 306, for example by performing a channel impulse response on the data received for that particular communication channel. At 308, a processor analyses the data to select an equalizer having, say, a first set of equalization coefficients based on the identified communication channel characteristic. The first set of equalization coefficients is selected from a plurality of (e.g. sets of) equalization coefficients, each of the plurality of equalization coefficients being associated with different communication channel characteristics.

In one example, the processor may be configured to estimate an 'average' or 'mid-point' shape of the received distribution of signals. In this regard, a collated set of a received distribution of signals may well follow a known bell-shaped curve. Thus, in this example, the processor may be configured to estimate one or more aspects of the received distribution of signals to determine if they substantially follow a pre-stored bell-shaped curve. Such a determination may include estimating an average (e.g. mean, or median) from all or a subset of the received distribution of signals, which may or may not be the mid-point of a bell-curve. Alternatively, or additionally, such a determination may include estimating a mid-point of a bell-curve for the received distribution of signals, for example by looking at the middle 5%, 10%, 20, or 40% of distributed samples. In another example, a suitable channel set may be a channel that exhibits channel characteristics similar to another channel. As a consequence, the two channels may be considered as being substantially equivalent in terms of how the channels affect data that is passed there through, and thereby be assigned to the same channel set. Based on the determined channel set, the processor applies a particular set of equalization coefficients to one or more generic equalizers in 310. Once the channel set in the NFC system has been determined, and suitable equalization coefficients applied to one or more generic equalizers, the equalized data is detected in 312.

In this manner, using a generic equalizer, no training sequence is required and a fast estimation time can be achieved using the prior channel knowledge that associates the channel with a channel set of channels exhibiting similar characteristics.

However, if a given set of channels has a large variation in Quality (Q) factors, the generic equalizer may not reduce any ISI to the levels desired. Therefore, a further example of the invention proposes to classify a given set of channel responses into subsets, each containing similarly-shaped channel responses. Thereafter, examples of the invention propose to obtain a generic equalizer for each subset of similarly-shaped channel responses. In other examples, for different channel types, one example of the invention proposes to classify the channels into sets based on similarity, and obtain a generic equalizer for each set.

Figure 4:
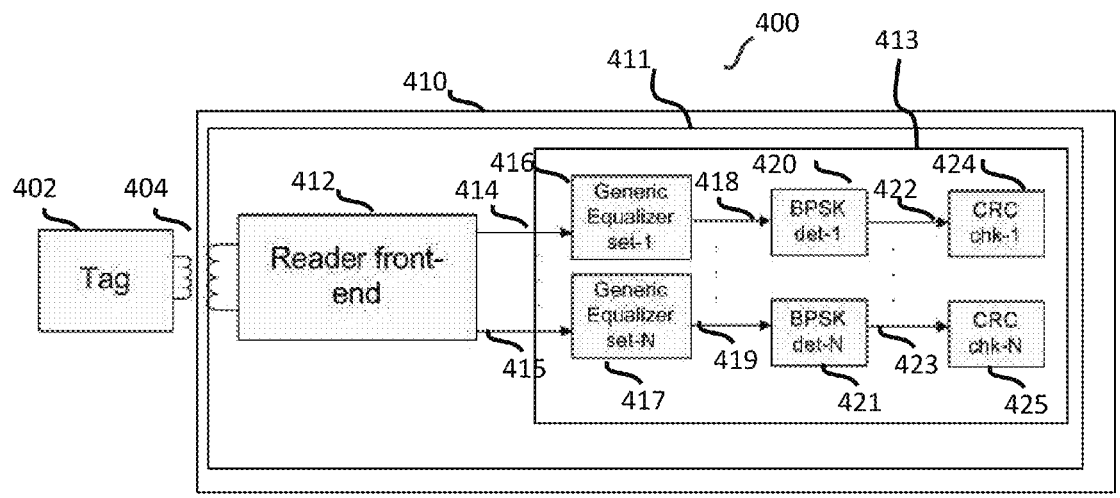
FIG. 4 illustrates a second example of a NFC communication device configured according to a second example embodiment of the present invention.

A first example receiver design that employs multiple parallel receiver chains is described in FIG. 4, where equalizer coefficients are allocated to multiple parallel generic equalizers, for example on a per channel set basis. In employing multiple parallel receiver chains, the first example receiver design is able to select and apply respective equalizer coefficients without exhibiting any latency. In contrast, in a second example receiver design illustrated in FIG. 6, a blind algorithm may be used to determine the channel set, and thereby selected equalizer coefficients. The second example receiver design that utilizes a blind algorithm to select equalizer coefficients exhibits some latency. However, this approach requires less power and hardware.

Referring now to FIG. 4, there is illustrated an example of a simplified block diagram of part of an electronic device adapted to support the inventive concepts of an example of the present invention. FIG. 4 illustrates an NFC communication system 400 comprising a NFC communication link and the electronic device, in the context of the illustrated example of the invention, is an NFC reader circuitry 410 and a tag 402 according to examples of the present invention. In this example, the NFC reader circuitry 410 comprises an integrated circuit 411 that in some examples comprises a reader front end 412 that is arranged to capture a returned modulated sinusoidal waveform and a processor 413, such as a digital signal processor. The reader front end 412 provides multiple output signals 414, 415, to processor 413 that supports multiple receiver chains, with two chains shown for simplicity purposes only. In this example, therefore, there is no latency in the equalization and demodulating/decoding process. The multiple receiver chains comprise multiple generic equalizers 416, 417 configured to receive and equalize respective digital output signals 414, 415. In this example, each of the multiple generic equalizers 416, 417 is associated with a particular channel set. As such, each generic equalizer 416, 417, is configured with equalization coefficients that can equalize signals carried by a cluster of similar channels. Hence, a plurality of different equalizer coefficients are applied to a respective plurality of equalizers 416, 417, based on a range of values of the at least one communication channel characteristic. Thus, each generic equalizer 416, 417, perform generic equalization for cluster-n with respective generic equalization coefficients and produces respective equalized bit stream outputs 418, 419. Thus, in some examples, a cluster may be formed such that one equalizer provides acceptable performance for every channel in the cluster. The respective equalized bit stream outputs 418, 419 are input to multiple respective detectors in separate detector chains, which in this example are multiple binary phase shift keyed detectors 420, 421. The digital detector outputs 422, 423 are then input to multiple respective error correction circuits 424, 425, which in this example include cyclic redundancy checking (CRC) circuits 424, 425. If the channel carrying the data belongs to cluster-n, the n-th CRC will pass a given threshold. After each of the CRC circuits 424, 425 performs a CRC check on the received equalized data, the CRC output that passes a given threshold, perhaps by the largest margin, will be selected. The functionality in the processor 413 may be implemented as one or more of: hardware, firmware or software.

Advantageously, in this example and as a consequence of there being multiple receiver chains in parallel, no latency results and therefore no buffers are needed. However, in this example and as a result of providing multiple parallel receiver chains, slightly more hardware is required and more power is used.

Figure 5:
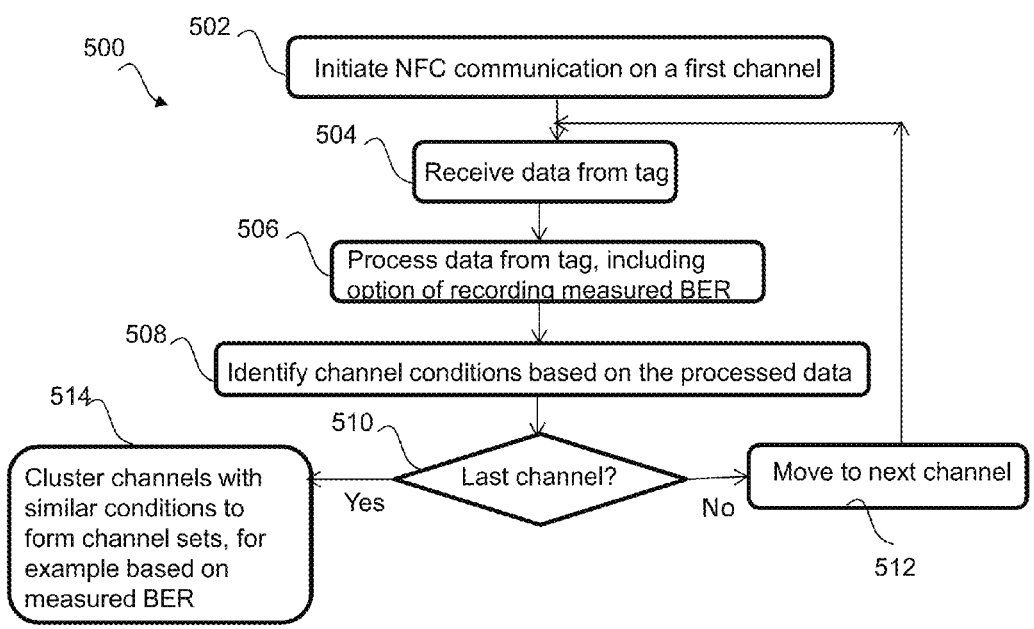
FIG. 5 illustrates a second example flowchart for generating clusters of similar channel sets, for example each comprising generic equalizers to use when detecting very high bit rate (VHBR) near field communications (NFC), according to examples of the present invention.

FIG. 5 illustrates a second example flowchart for generating a cluster of similar communication channels, such that a generic equalizer having one or more equalization coefficients may be allocated to equalize that cluster of similar communication channels, for example to use when detecting very high bit rate (VHBR) communication in near field communications (NFC), according to examples of the present invention. In one example, the cluster generation procedure may be performed in a laboratory using, say an external computer comprising a processor. In a further example, it is envisaged that the communication channel cluster classification system procedure may be performed within the device's processor or integrated circuit. FIG. 5 commences with a NFC communication being initiated in 502. In this example, data is received from a tag in 504, and the data processed in 506, for example including optionally measuring and recording bit error rate (or similar) measurements to indicate the state of the communication channel. At 508, a processor analyses the data to identify one or more channel characteristics, such as one or more of: a bit error rate (BER) or frame error rate (FER) of the received signal, a cyclic redundancy check (CRC) on each generic equalizer output, a constant modulus error at the generic equalizer output, based on the processed received data.

In this example flowchart, a determination is then made as to whether the processed channel data relates to the last channel to be processed, in 510. If it is determined that the processed channel data does not relate to the last channel to be processed, in 510, the process moves to the next channel in 512 and loops to 504 and repeats. If it is determined that the processed channel data does relate to the last channel to be processed, in 510, the processor then clusters channels that exhibit similar channel characteristics in 514. In one example, similar channels are clustered together to form a channel set, for example based on an identified range of values following their measured BER or FER performance.

In this manner, and thereafter based on a receiving data on a channel that is similar to a determined channel set, a processor in the electronic device, such as an NFC reader, is able to apply a particular set of equalization coefficients to one or more generic equalizers to equalize the received data prior to detection.

Figure 6:
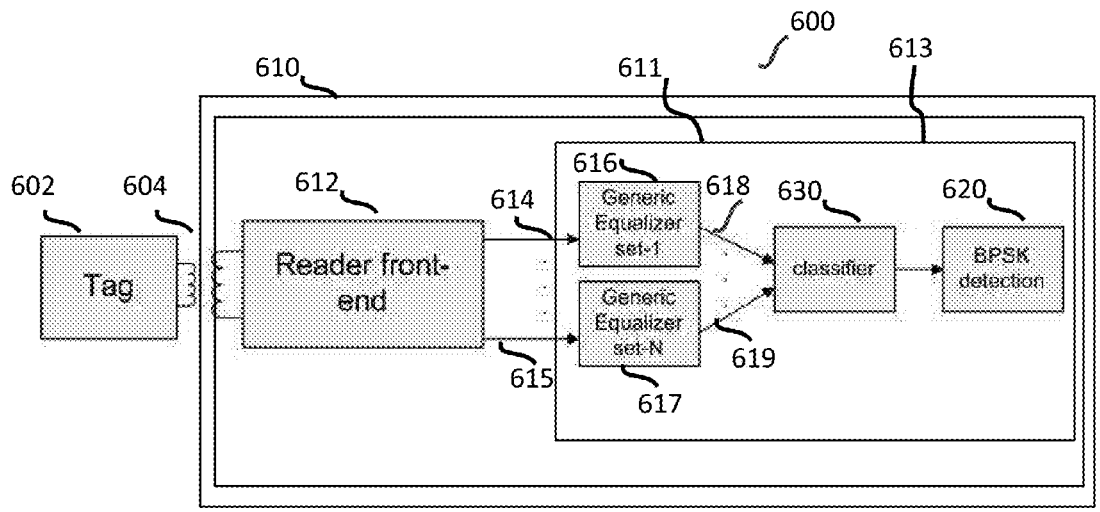
FIG. 6 illustrates a third example of a NFC communication device configured according to a third example embodiment of the present invention.

Referring to FIG. 6, there is illustrated a yet further example of a simplified block diagram of part of an electronic device adapted to support the inventive concepts of an example of the present invention. FIG. 6 illustrates an NFC communication link 600 and the electronic device, in the context of the illustrated example of the invention, is an NFC reader circuitry 610 and a tag 602 according to examples of the present invention. In this example, the NFC reader circuitry 610 comprises an integrated circuit 611 in this example and adopts a classification system to improve the equalization process. In one example, the communication channel cluster classification system procedure may be performed in a laboratory using, say an external computer comprising a processor. In a further example, it is envisaged that the communication channel cluster classification system procedure may be performed within the device's processor or integrated circuit. In one example, the classification system may divide the entire channel set into two or more clusters, whereby equalization coefficients are obtained for each cluster. In this scenario, a generic equalizer may be employed for each of the plurality of subsets. Cluster identification is the process of identifying the cluster to which the channel belongs to.

In this example, the NFC reader circuitry 610 comprises a reader front end 612 that is arranged to capture a returned modulated sinusoidal waveform and a processor 613, such as a digital signal processor. The reader front end 612 provides multiple output signals 614, 615, to processor 613 that supports multiple generic equalizers 616, 617 configured to receive and equalize respective digital output signals 614, 615, and produce respective equalized bit stream outputs 618, 619. Generic equalizer coefficients for various clusters are available at the receiver.

The respective equalized bit stream outputs 618, 619 are input into a classification system 630 to improve the equalization process. In one example, the classification system 630 may classify a given set into a plurality of subsets, whereby each subset contains similarly shaped channels. The classification system 630 determines whether the current channel may belong to any one of the known channel clusters. Alternatively, the output of each of the generic equalizers 616, 617 is assessed with the outputs varying dependent upon the equalizer coefficients employed in the respective generic equalizers 616, 617. The classification system 630 then determined the correct path, e.g. channel set and equalizer coefficients to use when detecting the receive signal based on a calculation, for example analyzing the equalized data to identify a constant modulus error. Thereafter, the classification system 630 selects one of the multiple equalizer coefficient sets to use based on the identified channel cluster and forwards the selected equalizer coefficient set for that channel cluster to a single detector, e.g. BPSK detector 620. The functionality in the processor 613 may be implemented as one or more of: hardware, firmware or software.

Advantageously, in this example of FIG. 6, only one detector chain is needed. As such, this approach uses less power consumption. However, in this example of FIG. 6, a certain number of samples from the multiple generic equalizer sets 616, 617, have to be obtained before the classification system can determine whether the current channel may belong to any one of the known channel clusters. The requirement to use multiple generic equalizer sets 616, 617, without duplicating detection and error checking for each path, introduces latency, as buffering of the data is necessary.

In this manner, a blind algorithm is used to select the equalizer coefficient set.

Figure 7:
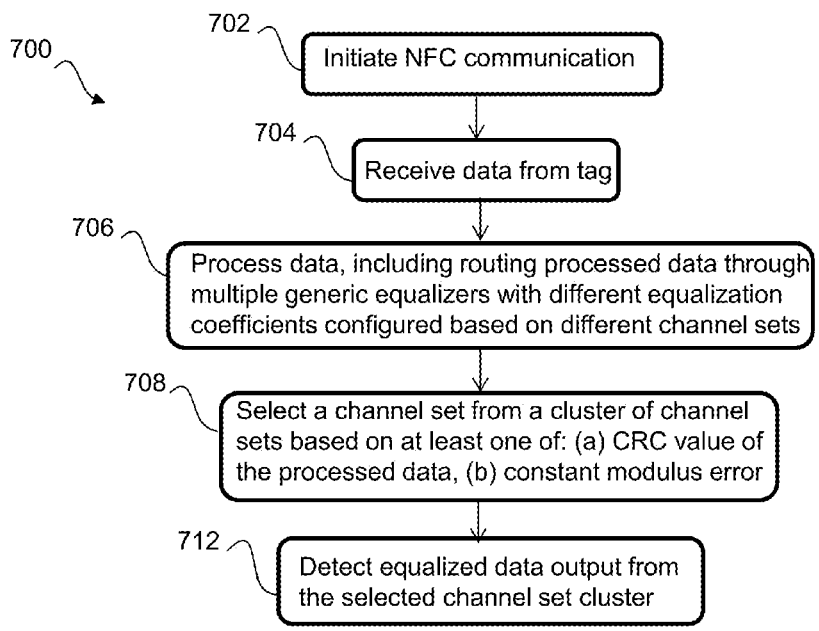
FIG. 7 illustrates a third example flowchart for selecting an output from one of a cluster of classified equalizers to use in detecting very high bit rate (VHBR) communication in near field communications (NFC), according to examples of the present invention.

FIG. 7 illustrates a third example flowchart for selecting an output from one of a cluster of channel sets, each having a generic equalizer configured to equalize a received data signal carried by a particular channel type, to use in detecting very high bit rate (VHBR) communication in near field communications (NFC), according to examples of the present invention. FIG. 7 commences with a NFC communication being initiated in 702. In this example, data is received from a tag in 704, and the data processed in 706, for example including routing the processed data through multiple generic equalizers with different equalization coefficients, configured based on different channel sets. At 708, a processor is configured to select a particular channel set (and thereby equalization coefficients) from a cluster of channel sets. In some examples, the processor is configured to select a particular channel set based on a CRC value of the processed data or compute a constant modulus error at the generic equalizer output and select an equalizer output to detect based on the constant modulus error. Thereafter, based on data received on a channel that is similar to a determined and selected channel set, a processor is able to apply detection to the selected equalized data in 712.

In the forgoing specification, an invention has been described with reference to specific illustrated examples. It will, however, be evident that various modifications and changes may be made therein without departing from the scope of the invention as set forth in the appended claims.

The connections as discussed herein may be any type of connections suitable to transfer signals from or to the respective nodes, units or devices, for example via intermediary components. Accordingly, unless implied or stated otherwise, the connections may for example be direct connections or indirect connections. The connections may be illustrated or described in reference to being a single connection, a plurality of connections, unidirectional connections or bidirectional connections. However, different illustrated examples may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Any arrangement of components to achieve the same functionality is effectively 'associated such that the desired functionality is achieved. Hence, any two components herein combined to achieve a particular functionality can be 'associated with' each other such that the desired functionality is achieved, irrespective of architectures or intermediary components. Likewise, two components so associated can also be viewed as being 'operably connected', or 'operably coupled' to each other to achieve the desired functionality.

Furthermore, those skilled in the art will recognise that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Furthermore, the illustrated examples may be implemented as circuitry located in a single integrated circuit or within the same device. Alternatively, the illustrated examples may be implemented as any number of separate integrated circuits or separate devices interconnected with each other in a suitable manner. However, other modifications, variations and alternatives are also possible. The specifications and drawings are, accordingly, to be regarded in an illustrative rather than in a restrictive sense.

In some examples, an integrated circuit for a wireless communication system is described wherein the integrated circuit comprises a processor configured to: receive a modulated signal on a communication channel; process the received modulated signal; identify a communication channel characteristic based on the processed received modulated signal; select an equalizer having a first set of equalization coefficients based on the identified communication channel characteristic, wherein the first set of equalization coefficients is selected from a plurality of equalization coefficients, each of the plurality of equalization coefficients being associated with different communication channel characteristics; equalize the processed received modulated signal on the communication channel using the selected equalizer; and detect the equalized received modulated signal.

In this manner, a generic equalizer having one or more equalization coefficients may be allocated to equalize signals from each of a cluster of similar communication channels, for example to use when detecting very high bit rate (VHBR) communication in near field communications (NFC). Furthermore, in this manner, a cluster may be formed such that one equalizer provides acceptable performance for every channel in the cluster. Thereafter, for example, a classification system may determine whether signals received on a current channel may belong to any one of the known channel clusters, and equalize the signals accordingly by applying at least one respective equalizer coefficient(s) associated with the known channel cluster.

In some examples, processor (which may be implemented on an integrated circuit) is described wherein the processor is configured to: process signals received on a plurality of communication channels; identify a range of values of at least one communication channel characteristic from signals received on the plurality of communication channels; cluster those channels exhibiting the identified range of values into a plurality of channel sets; select at least one equalizer coefficient for each of the channel set clusters; and apply a plurality of different equalizer coefficients to a respective plurality of equalizers based on the range of values of the at least one communication channel characteristic.

It will be appreciated that, for clarity purposes, the above description has described embodiments of the invention with reference to different functional units and processors. However, it will be apparent that any suitable distribution of functionality between different functional units or processors, for example with respect to the equalizers, detectors, cyclic redundancy check circuits or components, etc., may be used without detracting from the invention. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved electronic device, such as a communication unit, integrated circuit, processor for a computer and equalization method and method for clustering communication channels for equalization have been described, for example in equalizing very high bit rate (VHBR) communication in near field communications (NFC), wherein the aforementioned disadvantages with prior art arrangements have been substantially alleviated.

We claim:

1. An electronic device for a wireless communication system, the electronic device comprising:
a receiver configured to receive a modulated signal on a communication channel; and
a processor, coupled to the receiver and configured to:
process the received modulated signal;
determine a channel shape from the modulated signal;
identify a communication channel characteristic based on the processed received modulated signal;
select an equalizer associated with a cluster of communication channels exhibiting a similar channel shape to the determined channel shape and having a first set of equalization coefficients based on the identified communication channel characteristic, wherein the first set of equalization coefficients is selected from a plurality of equalization coefficients, each of the plurality of equalization coefficients being associated with different communication channel characteristics;
equalize the processed received modulated signal on the communication channel using the selected equalizer; and
detect the equalized received modulated signal.

2. The electronic device of claim 1 wherein the processor is configured to equalize a received near field communication, NFC, modulated signal by estimating equalization coefficients using a blind equalization algorithm based on the identified communication channel characteristic.

3. The electronic device of claim 1 wherein each set of equalization coefficients from the plurality of equalization coefficients is configured to equalize a plurality of communication channels exhibiting a particular communication channel characteristic.

4. The electronic device of claim 3 wherein the plurality of communication channels exhibiting the particular communication channel characteristic have been previously clustered into a channel set.

5. The electronic device of claim 1 wherein the processor is configured to determine a channel shape based on at least one from a group of:
an estimate of an average shape of a received distribution of signals on the communication channel,
an estimate of a mid-point shape of a received distribution of signals on the communication channel.

6. The electronic device of claim 1 wherein the processor is configured to select an equalizer based on the identified communication channel characteristic using an optimality criterion that minimizes inter-symbol interference for channel responses for each of the channel set clusters.

7. The electronic device of claim 1 wherein the processor is configured to calculate a bit error rate, BER, or frame error rate, FER, of the received signal such that the processor selects the equalizer based on the BER or FER of the received signal.

8. The electronic device of claim 1 wherein the processor is further configured to perform a cyclic redundancy check, CRC on each generic equalizer output and select an equalizer output to detect based on the CRC.

9. The electronic device of claim 1 wherein the processor is further configured to compute a constant modulus error at the generic equalizer output and select an equalizer output to detect based on the constant modulus error.

10. The electronic device of claim 1 wherein a plurality of equalizers is configured to apply at least one respective equalizer coefficient based on at least one pre-calibrated communication channel characteristic.

11. An electronic device for a wireless communication system, the electronic device comprising:

a receiver configured to receive a modulated signal on a communication channel; and a processor, coupled to the receiver and configured to:
process the received modulated signal;
identify a communication channel characteristic based on the processed received modulated signal;
determine whether the identified communication channel characteristic is within a threshold of being similar to a pre-determined communication channel characteristic;
select an equalizer having a first set of equalization coefficients based on the identified communication channel characteristic being within the threshold of the pre-determined communication channel characteristic, wherein the first set of equalization coefficients is selected from a plurality of equalization coefficients, each of the plurality of equalization coefficients being associated with different communication channel characteristics;
equalize the processed received modulated signal on the communication channel using the selected equalizer; and
detect the equalized received modulated signal.

12. An integrated circuit for a wireless communication system, the integrated circuit comprising a receiver configured to receive a modulated signal on a communication channel; and a processor coupled to the receiver and configured to:
process the received modulated signal;
determine a channel shape from the modulated signal;
identify a communication channel characteristic based on the processed received modulated signal;
select an equalizer associated with a cluster of communication channels exhibiting a similar channel shape to the determined channel shape and having a first set of equalization coefficients based on the identified communication channel characteristic, wherein the first set of equalization coefficients is selected from a plurality of equalization coefficients, each of the plurality of equalization coefficients being associated with different communication channel characteristics;
equalize the processed received modulated signal on the communication channel using the selected equalizer; and
detect the equalized received modulated signal.

13. A method for equalizing a signal in a wireless communication system, the method comprising:
receiving a modulated signal on a communication channel;
processing the received modulated signal;
determining a channel shape from the modulated signal;
identifying a communication channel characteristic based on the processed received modulated signal;
selecting an equalizer associated with a cluster of communication channels exhibiting a similar channel shape to the determined channel shape and having a first set of equalization coefficients based on the identified communication channel characteristic, wherein the first set of equalization coefficients is selected from a plurality of equalization coefficients, each of the plurality of equalization coefficients being associated with different communication channel characteristics;
equalizing the processed received modulated signal on the communication channel using the selected equalizer; and
detecting the equalized received modulated signal.

14. A near field communication, NFC, system comprising a NFC tag in communication with a NFC electronic device, wherein the NFC electronic device comprises:
a receiver configured to receive a modulated signal on a NFC communication channel; and
a processor, coupled to the receiver and configured to:
process the received modulated signal;
determine whether the identified communication channel characteristic is within a threshold of being similar to a pre-determined communication channel characteristic;
identify a NFC communication channel characteristic based on the processed received modulated signal;
select an equalizer having a first set of equalization coefficients based on the identified communication channel characteristic being within the threshold of the pre-determined communication channel characteristic, wherein the first set of equalization coefficients is selected from a plurality of equalization coefficients, each of the plurality of equalization coefficients being associated with different communication channel characteristics;
equalize the processed received modulated signal on the NFC communication channel using the selected equalizer; and
detect the equalized received modulated signal.

15. A method for equalizing a signal in a wireless communication system, the method comprising:
receiving a modulated signal on a communication channel;
processing the received modulated signal;
identify a communication channel characteristic based on the processed received modulated signal;
determining whether the identified communication channel characteristic is within a threshold of being similar to a pre-determined communication channel characteristic;
selecting an equalizer having a first set of equalization coefficients based on the identified communication channel characteristic being within the threshold of the pre-determined communication channel characteristic, wherein the first set of equalization coefficients is selected from a plurality of equalization coefficients, each of the plurality of equalization coefficients being associated with different communication channel characteristics;
equalizing the processed received modulated signal on the communication channel using the selected equalizer; and
detecting the equalized received modulated signal.

* * * * *